(12) United States Patent
Becker et al.

(10) Patent No.: US 7,694,271 B2
(45) Date of Patent: Apr. 6, 2010

(54) RENDERING GUI WIDGETS WITH GENERIC LOOK AND FEEL

(75) Inventors: Craig Henry Becker, Austin, TX (US); Jimmy Ming-Der Hsu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1662 days.

(21) Appl. No.: 10/787,663

(22) Filed: Feb. 26, 2004

(65) Prior Publication Data

US 2005/0193368 A1  Sep. 1, 2005

(51) Int. Cl.
G06F 9/44 (2006.01)
(52) U.S. Cl. .......................... 717/106; 717/113
(58) Field of Classification Search ............... 717/106, 717/113
See application file for complete search history.

(56) References Cited

U.S. PATENT DOCUMENTS

| | | | |
|---|---|---|---|
| 6,278,450 B1 * | 8/2001 | Arcuri et al. ............... 715/763 |
| 6,342,907 B1 * | 1/2002 | Petty et al. ................. 715/762 |
| 6,701,513 B1 * | 3/2004 | Bailey ......................... 717/109 |
| 7,024,633 B1 * | 4/2006 | Mann et al. ................. 715/765 |
| 7,124,398 B2 * | 10/2006 | Chen et al. .................. 717/106 |
| 2003/0037076 A1 * | 2/2003 | Bravery et al. .............. 707/517 |
| 2003/0169293 A1 * | 9/2003 | Savage ....................... 345/762 |
| 2004/0046789 A1 * | 3/2004 | Inanoria ..................... 345/748 |

* cited by examiner

*Primary Examiner*—Boris Pesin
*Assistant Examiner*—Anil N Kumar
(74) *Attorney, Agent, or Firm*—John Biggers; Justin Dillon; Biggers & Ohanian LLP.

(57) ABSTRACT

Rendering GUI widgets with generic look and feel by receiving in a display device a master definition of a graphics display, the master definition including at least one graphics definition element, the graphics definition element including a reference to a protowidget and one or more instance parameter values characterizing an instance of the protowidget, the protowidget includes a definition of a generic GUI object, including generic display values affecting overall look and feel of the graphics display, and rendering at least one instance of the protowidget to a graphics display in dependence upon the generic display values and the instance parameter values.

27 Claims, 4 Drawing Sheets

US 7,694,271 B2

RENDERING GUI WIDGETS WITH GENERIC LOOK AND FEEL

BACKGROUND OF THE INVENTION

1. Field of the Invention

The field of the invention is data processing, or, more specifically, methods, systems, and products for rendering graphical user interface ("GUI") widgets with generic look and feel.

2. Description of Related Art

It is difficult to design an overall look and feel for GUI displays and at the same time allow third parties other than the designer to establish custom controls, GUI components, or widgets to their own specifications. The designer may not wish to hinder the developer's ability to lay out screens and displays, but it is difficult to maintain overall look and feel without limiting layout specifications. An inflexible example would involve a set of control attributes for a button, where the attributes are rectangle width, rectangle height, text color, and background color. This may work for simple button designs, but when a developer wishes to build elliptical buttons that contain icons, inflexible predetermination of width, height, color, and so on, is insufficient.

SUMMARY OF THE INVENTION

Methods, systems, and products are disclosed that operate generally to support application developers other than an original look and feel designer to set up custom control with arbitrary additional aspects of look and feel. Methods, systems, and products according to embodiments of the present invention typically render GUI widgets with generic look and feel by receiving in a display device a master definition of a graphics display, the master definition including at least one graphics definition element, the graphics definition element including a reference to a protowidget and one or more instance parameter values characterizing an instance of the protowidget, the protowidget includes a definition of a generic GUI object, including generic display values affecting overall look and feel of the graphics display.

Typical embodiments also include rendering at least one instance of the protowidget to a graphics display in dependence upon the generic display values and the instance parameter values. In typical embodiments, rendering at least one instance of the protowidget includes inserting in the instance of the protowidget the instance parameter values from the master definition. In some embodiments, rendering at least one instance of the protowidget includes creating instance display values for the instance of the protowidget in dependence upon the instance parameter values. In many embodiments, the protowidget also includes at least one generic display rule and creating instance display values for the instance of the protowidget includes creating instance display values for the instance of the protowidget in dependence upon the generic display rule.

Typical embodiments include creating the protowidget, defining the protowidget in a scalable vector graphics language, and creating the master definition of a graphics display. In typical embodiments, rendering at least one instance of the protowidget also includes creating in computer memory a data structure representing an instance of the protowidget. In such embodiments, the data structure may be implemented as a DOM.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for rendering GUI widgets with generic look and feel. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Rendering GUI Widgets with Generic Look and Feel

Figure 1:
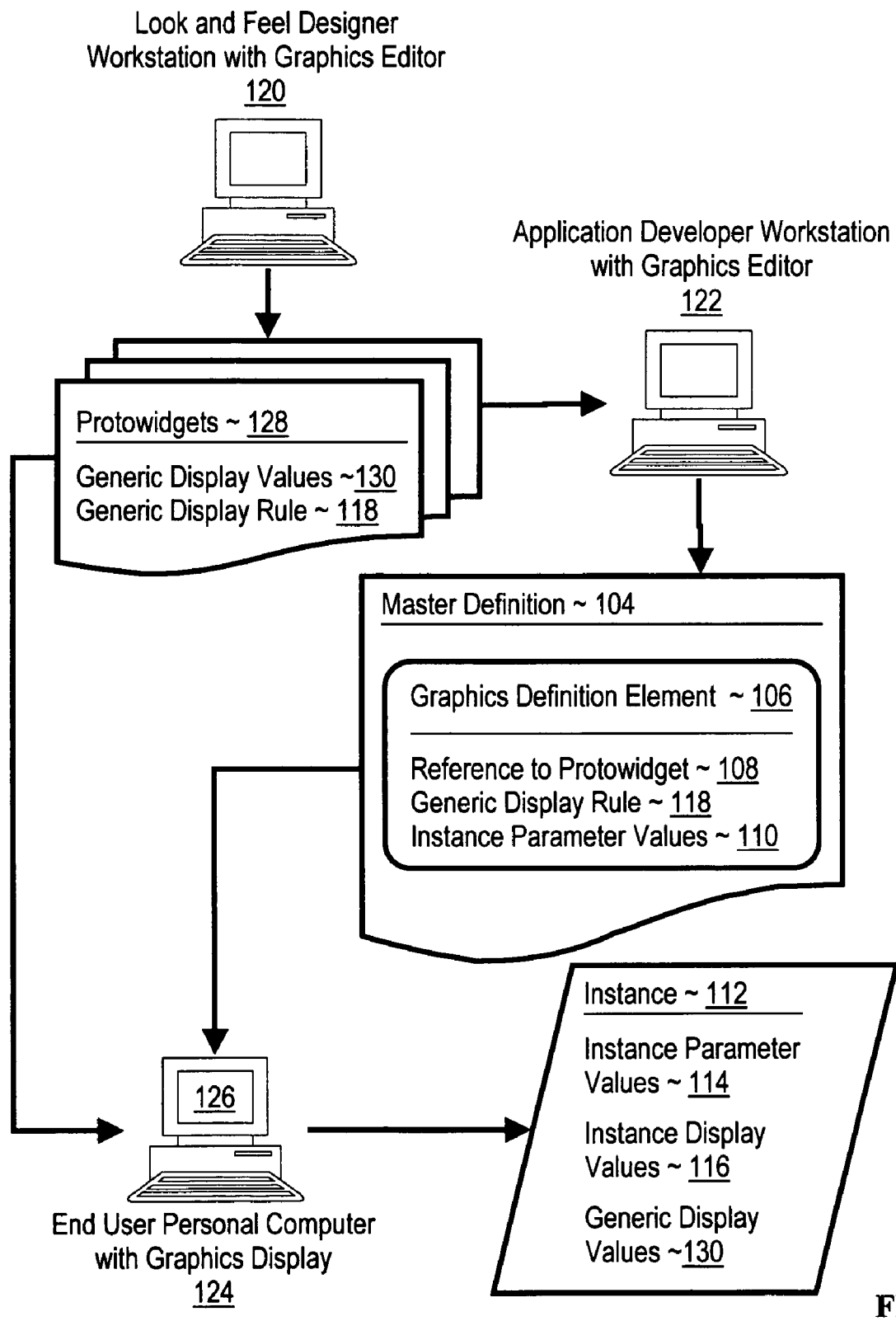
FIG. 1 sets forth a diagram of a system for rendering GUI widgets with generic look and feel.

Methods, systems, and products for rendering GUI widgets with generic look and feel are explained with reference to the accompanying drawings beginning with FIG. 1. FIG. 1 sets forth a diagram of a system for rendering GUI widgets with generic look and feel that operates generally by receiving in a display device (124) a master definition (104) of a graphics display. In the example of FIG. 1 the master definition includes at least one graphics definition element (106) that includes a reference (108) to a protowidget and one or more instance parameter values (110) characterizing an instance of the protowidget. In the example of FIG. 1, the protowidget (128) is a definition of a generic GUI object that includes generic display values (130) affecting overall look and feel of the graphics display and generic display rules (118) for use in deriving instance display values (116) from instance parameter values (110). In the system of FIG. 1, a display device (124) with a graphics display (126) renders at least one instance (112) of the protowidget (128) to a graphics display (126) in dependence upon the generic display values (130) and the instance parameter values (110).

A widget is a graphical user interface ("GUI") component that displays information and implements user input for interfacing with software applications and operating systems. 'Widget' is a term that is often used to refer to such graphical components. In some environments other terms are used for the same thing. In Java environments, for example, widgets are often referred to as 'components.' In other environments, widgets may be referred to as 'controls' or 'containers.' This disclosure, for clarity of explanation, uses the term 'widget' generally to refer to such graphical components. Examples of widgets include buttons, dialog boxes, pop-up windows, pull-down menus, icons, scroll bars, resizable window edges, progress indicators, selection boxes, windows, tear-off menus, menu bars, toggle switches, checkboxes, and more. The term 'widget' also refers to the underlying software program that displays the graphic component of the widget in a GUI and operates the widget, depending on what action the user takes while operating the GUI in response to the widget. That is, 'widget,' depending on context, refers to data making up a GUI component, a software program controlling a GUI component, or to both the data and the program.

A protowidget is a widget definition from which widgets may be instantiated with similar generic look and feel but different instance characteristics. Protowidgets typically are created by a generic look and feel designer operating a graphics editor on a graphics workstation or personal computer (120). Protowidgets may include generic display values (130) that govern the overall look and feel of a display, values that may be similar for a related group of protowidgets defining, buttons, dialog boxes, pull-down menus, and so on, all supporting the creation of instances of the protowidgets having a similar overall generic look and feel. Such a similar overall generic look and feel is sometimes referred to as a 'skin,' and GUI displays created by use of protowidgets according to instances of the present invention may be considered readily 'skinnable.' An instance of a protowidget, of course, is a widget, but for clarity in this specification, an instance derived from a protowidget is referred to as an 'instance.' A protowidget is typically defined in a graphics definition language, such as, for example, "SVG," the Scalable Vector Graphics language, a modularized language for describing graphics in XML, the eXtensible Markup Language. The SVG specification is promulgated by the World Wide Web Consortium.

A master definition (104) of a graphics display is a description of a display for one or more widgets, that is, instances of protowidgets. That is, the master definition lists protowidgets and describes how instances of them are to be created and displayed. Multiple instances of a single protowidget may be described in a master definition. That is, a protowidget defining a tool bar button, for example, may be instantiated and used at several locations on a single GUI display to perform several different functions.

Figure 2:
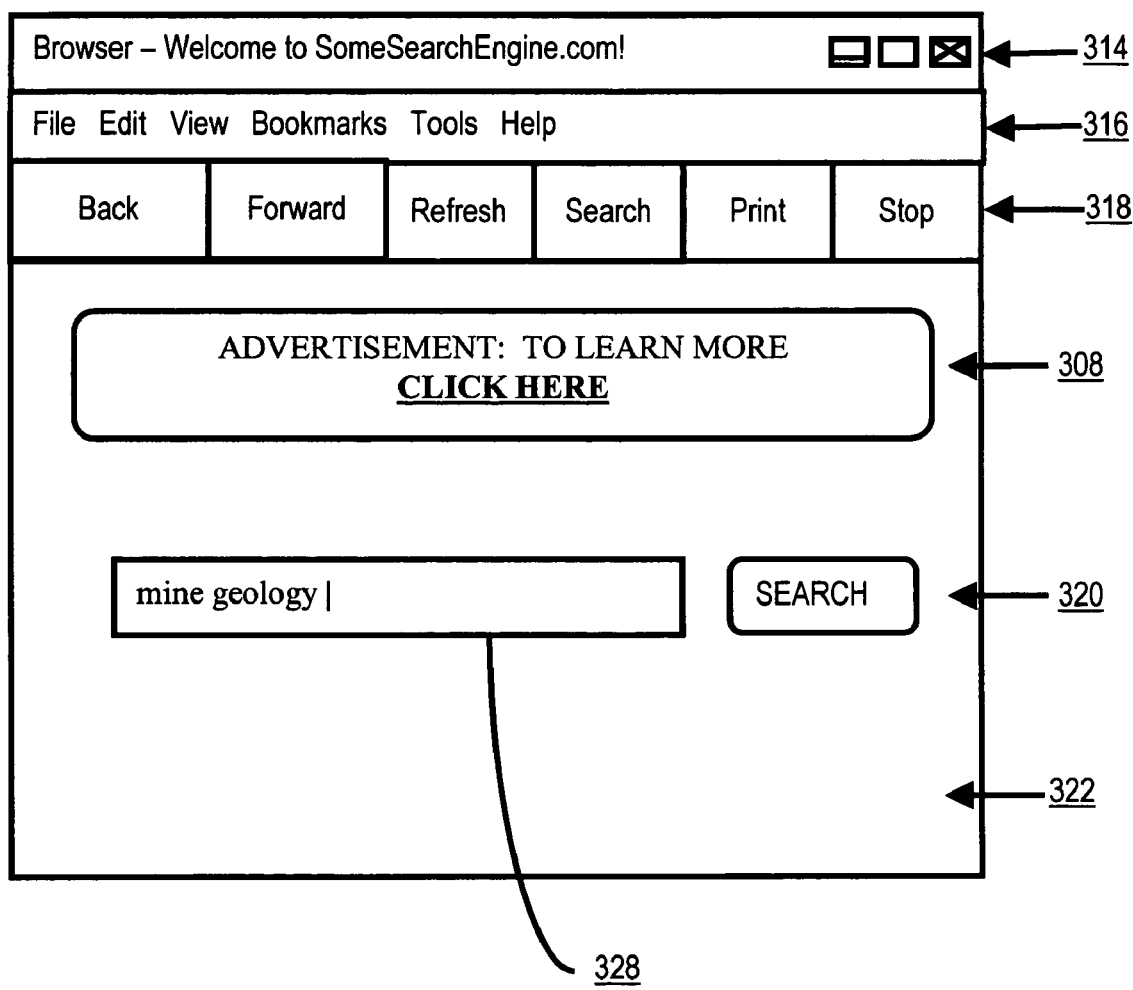
FIG. 2 sets forth a line drawing that depicts an exemplary graphics display on a computer running a data communication application.

For further explanation, consider the example of the display shown in FIG. 2. FIG. 2. FIG. 2 sets forth a line drawing that depicts an exemplary graphics display on a computer running a data communication application, more particularly, in the example of FIG. 2, a web browser. The browser of FIG. 2, as depicted, has been operated by a user to point to a web site named "SomeSearchEngine.com," as shown in the title bar of the browser display (314). The browser of FIG. 2 includes a GUI toolbar (318) with a Back button, a Forward button, and buttons for refreshing the display, searching, printing, and stopping web page retrievals. The browser of FIG. 2 also includes a horizontal menu (316) containing the menu items File, Edit, View, Bookmark (sometimes called 'Favorites'), Tools, and Help. The browser of FIG. 2 displays a search query, "mine geology," displayed in a query entry field (328). In this example, a user ceased operations just before invoking the search feature (320) of the search engine, so that the area of the graphics display in which search results are displayed is still empty (322). The graphics display in this example includes an advertisement (308) that supports a hyperlink labeled "CLICK HERE."

In the example of FIG. 2, every graphical object on the display may be a widget, that is, an instantiation of a protowidget. In particular, all the buttons on the toolbar (318) may be instantiations of a single button protowidget instantiated several times to form multiple widgets having generic look and feel with differing instance display values effecting differing locations with differing label text.

That fact the exemplary application of FIG. 2 is represented as a browser is not a limitation of the present invention. On the contrary, many applications that implement rendering GUI widgets with generic look and feel are useful in various embodiments of the present invention, including email clients, word processors, database applications such as are used by personal digital assistants ("PDAs"), and so on. The use of all such applications, and others as will occur to those of skill in the art, is well within the scope of the present invention.

In the system of FIG. 1, a display device (124) with a graphics display (126) renders at least one instance (112) of the protowidget (128) to a graphics display (126) in dependence upon generic display values (130) and instance parameter values (110). Generic display values (130) are display values effecting overall look and feel of a display or a set of related displays, as, for example, a set of display screens related in the sense that they are all screens provided by a single software application or a single web site. Generic overall look and feel is the fact that such screens advantageously provide widgets having similar edge treatments, similar colors, similar hatching and shading, similar fonts in their labels and other text elements, and so on. Instance parameter values (110) are values affecting the creation and display of a particular widget without affecting overall look and feel. Examples of instance display values include display location, height, width, label text, and so on.

In the system of FIG. 1, a look and feel designer uses a graphics editor on a workstation (120) to create one or more protowidgets (128). Each protowidget is a definition of a type of widget that may be instantiated by use of the protowidget and one or more instance parameter values from a master definition (104). Each protowidget in this example includes generic display values (130) and generic display rules (118). Generic display rules are rules that are applied to instance parameter values (114) when a widget is rendered to create instance display values (116). In many systems according to embodiments of the present invention, creating a protowidget is carried out by expressing the protowidget in a scalable vector graphics language such as SVG from the World Wide Web Consortium.

In the system of FIG. 1, an application developer uses a graphics editor on a workstation (122) to create a master definition (104) of a graphics display. A master definition may advantageously be expressed in an XML language, although in some embodiments at least the master definition language is not be the language in which protowidgets are specified. The master definition language may manipulate protowidgets at a level of abstraction above the protowidgets. In other words, a language for specifying a display of widgets defined in an XML language such as SVG advantageously is a kind of superset of SVG.

Given the flexibility of XML language specification, many such super-languages no doubt will occur to those of skill in the art, but one example of a language in which master definitions of graphics may be expressed is MXML from Macromedia, Inc., 600 Townsend Street, San Francisco, Calif. 94103. MXML is an XML-based markup language used to declaratively describe the layout of widgets on a graphics display, and an object-oriented programming language which handles user interactions with an application. MXML runs on a presentation server from Macromedia called "Flex." Flex is a presentation server installed on top of a Java™ application server or servlet container.

Here is an example of a master definition (104) of a graphics display expressed in MXML:

```
<?xml version="1.0" encoding="UTF-8"?>
<mx:Application width='700' height='700'
    xmlns:mx="http://www.macromedia.com/2003/mxml" >
    <mx:VBox>
        <mx:Button id="button1" label="Press Me" width="125"
            height="35" />
        <mx:CheckBox id="checkbox1" label="Check Me" />
        <mx:ComboBox id="combobox1" width="100"
        height="35"/>
    </mx:VBox>
</mx:Application>
```

This exemplary master definition lists references to three protowidgets, a Button, a CheckBox, and a ComboBox. The Button has instance parameter values for an identification code of 'button1,' for a width of '125', and for a height of '35'. The CheckBox has instance parameter values for an identification code of 'checkbox1' and for label text of 'Check Me.' The ComboBox has instance parameter values for an identification code of 'combobox1,' for a width of '100', and for a height of '35.'

The references to all three protowidgets include a namespace identifier 'mx' at a location in cyberspace specified by the URL: "http://www.macromedia.com /2003/mxml." The URL identifies the location of the protowidgets for each reference, the Button, the CheckBox, and the ComboBox. That is, in this example, a reference to a protowidget is implemented as a markup element name of another markup document where the protowidget is defined. As described in more detail below, the protowidgets found at the URL contain the pertinent generic display values and generic display rules effecting their overall look and feel.

Figure 3:
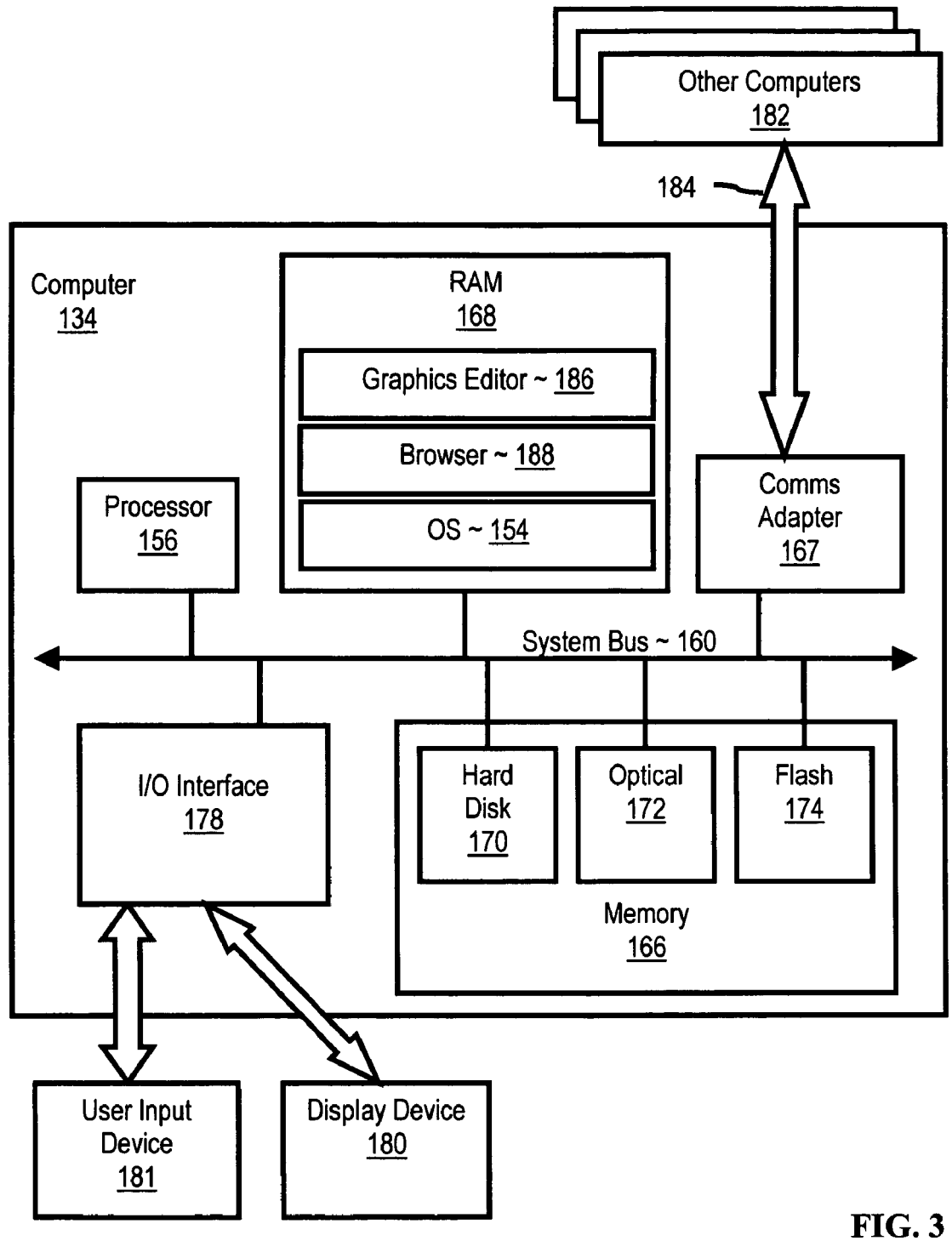
FIG. 3 sets forth a block diagram of automated computing machinery comprising a computer useful to render GUI widgets with generic look and feel.

Display devices in this specification are generally computers, that is, any automated computing machinery having a graphics display. The terms "display device" or "computer" include not only general purpose computers such as laptops, personal computer, minicomputers, and mainframes, but also devices such as personal digital assistants ("PDAs), network enabled handheld devices, internet-enabled mobile telephones, and so on. FIG. 3 sets forth a block diagram of automated computing machinery comprising a computer (134) useful according to various embodiments of the present invention to render GUI widgets with generic look and feel.

The computer (134) of FIG. 3 includes at least one computer processor (156) or 'CPU' as well as random access memory(168) ("RAM"). Stored in RAM (168) is are two application program, a graphics editor (186) and a browser (188). The use of a graphics editor and a browser is for explanation, not for limitation. Application programs useful in rendering GUI widgets with generic look and feel in accordance with various embodiments of the present invention include browsers, word processors, spreadsheets, database management systems, email clients, and others as will occur to those of skill in the art.

Also stored in RAM (168) is an operating system (154). Operating systems useful in computers according to embodiments of the present invention include Unix, Linux198 , Microsoft NT™, and others as will occur to those of skill in the art. In the example of FIG. 3, operating system (154) also includes at least one device driver for use in input/output communications among applications (186 and 188), user input devices (180), and graphics displays (180). Examples of graphics displays include GUI screens, touch sensitive screens, a liquid crystal displays, and the like. Examples of user input devices include mice, keyboards, numeric keypads, touch sensitive screens, microphones, and so on.

The example computer (134) of FIG. 3 includes computer memory (166) coupled through a system bus (160) to the processor (156) and to other components of the computer. Computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer (134) of FIG. 3 includes communications adapter (167) that implements connections for data communications (184) to other computers (182). Communications adapters (167) implement the hardware level of data communications connections through which client computers and servers send data communications directly to one another and through networks. Examples of communications adapters (167) include modems for wired dial-up connections, Ethernet (IEEE 802.3) adapters for wired LAN connections, 802.11 adapters for wireless LAN connections, and Bluetooth adapters for wireless microLAN connections. The example computer of FIG. 3 includes one or more input/output interface adapters (178). Input/output interface adapters (178) in computer (134) include hardware that implements user input/output to and from user input devices (181) and graphics display (180). Examples of input/output interface adapters include mouse adapters, keyboard adapters, and particularly graphics adapters.

Figure 4:
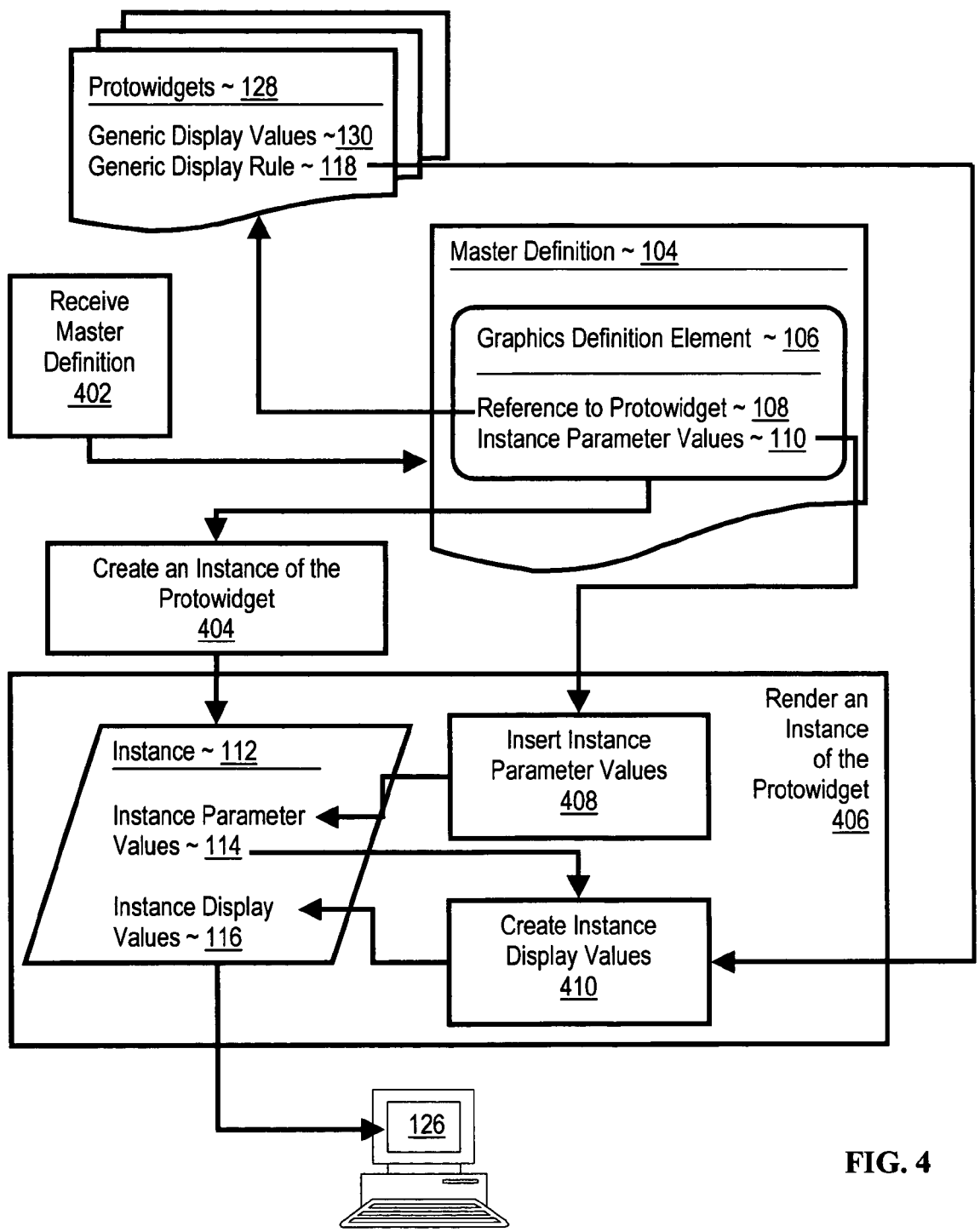
FIG. 4 sets forth a flow chart illustrating an exemplary method for rendering a GUI widget with generic look and feel.

For further explanation, FIG. 4 sets forth a flow chart illustrating an exemplary method for rendering a GUI widget with a generic look and feel that includes receiving (402) in a display device a master definition (104) of a graphics display, the master definition including at least one graphics definition element (106). In the example of FIG. 4, the graphics definition element (106) includes a reference (108) to a protowidget and one or more instance parameter values (110) characterizing an instance of the protowidget. In the example of FIG. 4, the protowidget (128) includes a definition of a generic GUI object which in turn includes generic display values (130) affecting overall look and feel of the graphics display. The exemplary method of FIG. 4 also includes rendering (406) at least one instance (112) of the protowidget (128) to a GUI display (126) in dependence upon the generic display values (130) and the instance parameter values (110). In the method of FIG. 4, rendering at least one instance (112) of the protowidget includes creating in computer memory a data structure comprising an instance (112) of the protowidget (128). In the method of FIG. 4, a data structure comprising an instance (112) of the protowidget (128) may be implemented as a DOM. A DOM is a 'Document Object Model,' a data structure created according to a specification for how the graphical elements of a document are represented and rendered. A DOM contains attribute values defining graphics objects, and provides an API (application programming interface) for manipulating the graphics objects. The Dynamic HyperText Markup Language ("DHTML"), for example, relies on a DOM to dynamically change the appearance of Web pages after they have been downloaded to a user's browser.

Netscape and Microsoft specify HTML DOMs for their browsers, but the W3C's DOM specification supports both HTML and XML. The W3C's DOM specification includes an API for valid HTML and well-formed XML documents. It defines the logical structure of documents and the way a document is accessed and manipulated. A DOM may be used to manage or manipulate any graphics components or widgets represented in compliant XML. With a DOM, programmers can build documents, navigate their structure, and add, modify, or delete elements and content. Almost anything found in an HTML or XML document can be accessed, changed, deleted, or added using a DOM. The specification for the DOM API for use with any programming language. The specification itself at this time provides language bindings for Java and ECMAScript, an industry-standard scripting language based on JavaScript and JScript.

In the method of FIG. 4, rendering (406) at least one instance (112) of the protowidget (128) includes inserting (408) in the instance (112) of the protowidget the instance parameter values (110) from the master definition (104) and creating (410) instance display values (116) for the instance (112) of the protowidget (128) in dependence upon the instance parameter values (114). In the method of FIG. 4, the protowidget (128) includes at least one generic display rule (118) and creating (410) instance display values (116) for the instance (112) of the protowidget (128) is carried out by creating instance display values for the instance (112) of the protowidget (128) in dependence upon the generic display rule (118). The following exemplary SVG representation of a protowidget for a GUI button is provided for further explanation:

```
<?xml version="1.0" encoding="iso-8859-1"?>
<!DOCTYPE svg PUBLIC "-//W3C//DTD SVG 20000303 Stylable//EN"
  "http://www.w3.org/TR/2000/03/WD-SVG-20000303/DTD/svg-
  20000303-stylable.dtd">
<svg id="svgRoot" xml:space="preserve" width="300" height="300">
  <desc>MXML Button</desc>
  <style type="text/css"> <![CDATA[ .t1 { fill: #00ff00; stroke:
    #ff0000; } .t2 { text-anchor: middle; } ]]> </style>
  <!-- Begin ECMA Script -->
  <script type="text/ecmascript"> <![CDATA[
    var parms = document.getElementById("parms");
    var rect1 = document.getElementById("Button.rect1");
    var rect2 = document.getElementById("Button.rect2");
    var text = document.getElementById("Button.text");
    function setX(att) { }
  function setY(att) { }
  function setWidth(att) {
    rect1.setAttribute("width", att-1);
    rect2.setAttribute("width", att-5);
    text.setAttribute("x", att/2); }
  function setHeight(att) {
    rect1.setAttribute("height", att-1);
    rect2.setAttribute("height", att-5);
    text.setAttribute("y", att*7/10); }
```

-continued

```
  function setBackgroundColor(att) {rect2.setAttribute("fill", att); }
  function setColor(att) {
    rect1.setAttribute("stroke", att);
    rect2.setAttribute("stroke", att);
    text.setAttribute("fill", att); }
  function setLabel(att) {
    var fc = text.getFirstChild( );
    alert("fc: "+fc);
    fc.setNodeValue(att); }
  function setFontFamily(att) {text.setAttribute("font-family", att); }
  function setFontSize(att) {text.setAttribute("font-size", att); }
  function setFontStyle(att) { text.setAttribute("font-style", att);}
  function setFontWeight(att) {text.setAttribute("font-weight", att); }
  <!-- Begin Set Parms function -->
  function setParms(evt) {
    if (parms.hasAttribute("MxmlX")) {
      setX(parms.getAttribute("MxmlX")); }
    if (parms.hasAttribute("MxmlY")) {
      setY(parms.getAttribute("MxmlY")); }
    if (parms.hasAttribute("MxmlWidth")) {
      setWidth(parms.getAttribute("MxmlWidth")); }
    if (parms.hasAttribute("MxmlHeight")) {
      setHeight(parms.getAttribute("MxmlHeight")); }
    if (parms.hasAttribute("MxmlBackgroundColor")) {
      setBackgroundColor(parms.getAttribute(
      "MxmlBackgroundColor"));}
    if (parms.hasAttribute("MxmlColor")) {
      setColor(parms.getAttribute("MxmlColor")); }
    if (parms.hasAttribute("MxmlLabel")) {
      setLabel(parms.getAttribute("MxmlLabel")); }
    if (parms.hasAttribute("MxmlFontFamily")) {
      setFontFamily(parms.getAttribute( "MxmlFontFamily"));}
    if (parms.hasAttribute("MxmlFontSize")) {
      setFontSize(parms.getAttribute("MxmlFontSize"));}
    if (parms.hasAttribute("MxmlFontStyle")) {
      setFontStyle(parms.getAttribute("MxmlFontStyle"));}
    if (parms.hasAttribute("MxmlFontWeight")) {
      setFontWeight(parms.getAttribute( "MxmlFontWeight")); }
    setLabel("test");
  } ]]>
</script>
<!-- Begin Component Definitions -->
  <rect id="parms" x="0" y="0" width="0" height="0" fill="none"
    stroke="none"/>
  <symbol id="Button">
    <rect id="Button.rect1" x="0" y="0" width="50" height="22"
      rx="3" ry="3" fill="#ffffff" stroke="#949694"/>
    <rect id="Button.rect2" x="2" y="2" width="46" height="18"
      rx="2" ry="2" fill="#ffffff" stroke="#D6DADC"/>
    <text id="Button.text" class="t2" x="25" y="16" font-
      size="12" fill="#000000">mx:Button</text>
  </symbol>
  <!-- Begin Component Usage -->
  <use id="Button.use" xlink:href="#Button" onload="setParms(evt)"/>
</svg>
```

This exemplary protowidget contains two SVG component definitions, one for the button itself, <symbol id="Button">, and another component definition:

```
<rect id="parms" x="0" y="0" width="0" height="0" fill="none"
  stroke="none"/>
``` defining storage locations for instance parameter values. The rectangle having id="parms" is considered a dummy component, not to be displayed, but provided only to define the storage space for the instance parameter values inside an instance of the protowidget, such as, for example, a DOM. In the example of FIG. 4, the instance (112) of the protowidget (128) under processing may typically be implemented as a DOM. In fact, as a practical matter, in an example like the method of FIG. 4, the master definition (104) also is represented initially as XML and then parsed into a DOM in computer memory for processing through a DOM's API. Using the exemplary SVG protowidget defined above, inserting (408) of the protowidget the instance parameter values (110) from the master definition (104) is carried out at render time by calling the function identified in the component usage description in the SVG definition:

```
<use id="Button.use" ... onload="setParms(evt)"/>
```

That is, the rendering function at render time calls the 'onload' function defined in the SVG for the protowidget, "setParms( )." The setParms( ) function tests with an if( ) statement whether each supported instance parameter has a value in the master definition ("parms"), and, if the value is present, setParmtZ( ) sets that value in a DOM representing an instance of the protowidget. The functions setX( ), setY( ), setWidth( ), setHeight( ), and so on, are DOM API functions. In this example, creating (410) instance display values (116) for the instance (112) of the protowidget (128) in dependence upon the instance parameter values (114) may be carried out in a trivial example by using the instance parameter values as instance display values. Often, however, the protowidget (128) includes at least one generic display rule (118) and creating (410) instance display values (116) for the instance (112) of the protowidget (128) is carried out by creating instance display values for the instance (112) of the protowidget (128) in dependence upon the generic display rule (118). In the exemplary SVG protowidget set forth above, a generic display rule is exemplified by the member method:

```
function setWidth(att) {
    rect1.setAttribute("width", att-1);
    rect2.setAttribute("width", att-5);
    text.setAttribute("x", att/2); }
``` in which the value of the parameter 'att' is an instance parameter value which is used according to processing rules to produce instance display values. In this example, the generic display rules may be interpreted as:
  for a first rectangle defining the screen appearance of a button, create the instance display value for the width of the first rectangle as the instance parameter value minus 1
  for a second rectangle defining the screen appearance of a button, create the instance display value for the width of the second rectangle as the instance parameter value minus 5
  for button text defining the screen appearance of a button, create the instance display value for the button text as the instance parameter value divided by 2

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for rendering a GUI widget with a generic look and feel, the method comprising:
  receiving in a display device a master definition of a graphics display, the master definition including at least one graphics definition element,
  the graphics definition element comprising a reference to a protowidget and one or more instance parameter values characterizing an instance of the protowidget,
  the protowidget comprising a definition of a generic GUI object, including generic display values affecting overall look and feel of the graphics display; and
  rendering at least one instance of the protowidget to a graphics display in dependence upon the generic display values and the instance parameter values.

2. The method of claim 1 wherein rendering at least one instance of the protowidget further comprises inserting in the instance of the protowidget the instance parameter values from the master definition.

3. The method of claim 1 wherein rendering at least one instance of the protowidget further comprises creating instance display values for the instance of the protowidget in dependence upon the instance parameter values.

4. The method of claim 3 wherein:
  the protowidget further comprises at least one generic display rule, and
  creating instance display values for the instance of the protowidget further comprises creating instance display values for the instance of the protowidget in dependence upon the generic display rule.

5. The method of claim 1 further comprising creating the protowidget.

6. The method of claim 5 wherein creating the protowidget further comprises defining the protowidget in a scalable vector graphics language.

7. The method of claim 1 further comprising creating the master definition of a graphics display.

8. The method of claim 1 wherein rendering at least one instance of the protowidget further comprises creating in computer memory a data structure comprising an instance of the protowidget.

9. The method of claim 8 wherein the data structure comprising an instance of the protowidget further comprises a DOM.

10. A system for rendering a GUI widget with a generic look and feel, the system comprising:
  means for receiving in a display device a master definition of a graphics display, the master definition including at least one graphics definition element,
  the graphics definition element comprising a reference to a protowidget and one or more instance parameter values means for characterizing an instance of the protowidget,
  the protowidget comprising a definition of a generic GUI object, including generic display values affecting overall look and feel of the graphics display; and
  means for rendering at least one instance of the protowidget to a graphics display in dependence upon the generic display values and the instance parameter values.

11. The system of claim 10 wherein means for rendering at least one instance of the protowidget further comprises means for inserting in the instance of the protowidget the instance parameter values from the master definition.

12. The system of claim 10 wherein means for rendering at least one instance of the protowidget further comprises means for creating instance display values for the instance of the protowidget in dependence upon the instance parameter values.

13. The system of claim 12 wherein:
  the protowidget further comprises at least one generic display rule, and means for creating instance display values for the instance of the protowidget further comprises means for creating instance display values for the instance of the protowidget in dependence upon the generic display rule.

14. The system of claim 10 further comprising means for creating the protowidget.

15. The system of claim 14 wherein means for creating the protowidget further comprises means for defining the protowidget in a scalable vector graphics language.

16. The system of claim 10 further comprising means for creating the master definition of a graphics display.

17. The system of claim 10 wherein means for rendering at least one instance of the protowidget further comprises means for creating in computer memory a data structure comprising an instance of the protowidget.

18. The system of claim 17 wherein the data structure comprising an instance of the protowidget further comprises a DOM.

19. A computer program product for rendering a GUI widget with a generic look and feel, the computer program product comprising:
a recording medium;
means, recorded on the recording medium, for receiving in a display device a master definition of a graphics display, the master definition including at least one graphics definition element,
the graphics definition element comprising a reference to a protowidget and one or more instance parameter values means, recorded on the recording medium, for characterizing an instance of the protowidget,
the protowidget comprising a definition of a generic GUI object, including generic display values affecting overall look and feel of the graphics display; and
means, recorded on the recording medium, for rendering at least one instance of the protowidget to a graphics display in dependence upon the generic display values and the instance parameter values.

20. The computer program product of claim 19 wherein means, recorded on the recording medium, for rendering at least one instance of the protowidget further comprises means, recorded on the recording medium, for inserting in the instance of the protowidget the instance parameter values from the master definition.

21. The computer program product of claim 19 wherein means, recorded on the recording medium, for rendering at least one instance of the protowidget further comprises means, recorded on the recording medium, for creating instance display values for the instance of the protowidget in dependence upon the instance parameter values.

22. The computer program product of claim 21 wherein:
the protowidget further comprises at least one generic display rule, and
means, recorded on the recording medium, for creating instance display values for the instance of the protowidget further comprises means, recorded on the recording medium, for creating instance display values for the instance of the protowidget in dependence upon the generic display rule.

23. The computer program product of claim 19 further comprising means, recorded on the recording medium, for creating the protowidget.

24. The computer program product of claim 23 wherein means, recorded on the recording medium, for creating the protowidget further comprises means, recorded on the recording medium, for defining the protowidget in a scalable vector graphics language.

25. The computer program product of claim 19 further comprising means, recorded on the recording medium, for creating the master definition of a graphics display.

26. The computer program product of claim 19 wherein means, recorded on the recording medium, for rendering at least one instance of the protowidget further comprises means, recorded on the recording medium, for creating in computer memory a data structure comprising an instance of the protowidget.

27. The computer program product of claim 26 wherein the data structure comprising an instance of the protowidget further comprises a DOM.

* * * * *